Dec. 6, 1955 J. F. BIGELOW 2,726,282
TELEVISION SYNCHRONIZING SYSTEM
Filed Oct. 27, 1952 3 Sheets-Sheet 1

INVENTOR.
JOHN F. BIGELOW
BY
Lockwood, Galt, Woodard, & Smith
ATTORNEYS

TELEVISION SYNCHRONIZING SYSTEM

Filed Oct. 27, 1952 3 Sheets-Sheet 2

INVENTOR
JOHN F. BIGELOW

BY

ATTORNEYS

INVENTOR.
JOHN F. BIGELOW
BY
*Lockwood, Galt, Woodard, & Smith*
ATTORNEYS

United States Patent Office 2,726,282

Patented Dec. 6, 1955

2,726,282

TELEVISION SYNCHRONIZING SYSTEM

John F. Bigelow, Fort Wayne, Ind., assignor to International Telephone and Telegraph Corporation, a corporation of Maryland Application October 27, 1952, Serial No. 317,027

14 Claims. (Cl. 178—69.5)

The present invention relates to a television synchronization system, and more particularly to a system for improving the synchronization of the television receiver picture with the picture information emanating from the television transmitter.

The present invention has particular utility in connection with present color television systems, but, is not limited thereto, having principles which may be similarly incorporated in monochrome television systems for improving the quality of reproduction of receivers, as will occur to persons skilled in the art.

At the time of filing this application for patent there are two major color television systems which are favored over other suggested color systems, viz. the sequential color system and the simultaneous color system. In the sequential system, the optical images to be transmitted are mechanically scanned by three separate color filters consisting of the colors red, blue and green. Thus, the television signal emitted by the transmitter will contain three distinct sequentially occurring color signal waves corresponding respectively to the aforementioned separate primary colors. Hence, the term sequential color television has been assigned to this method of reproducing color television images.

The television system characterized as the simultaneous color system, differs from the sequential system in the fact that all colors are transmitted together, i. e. without any sequential arrangement between single separated colors as in the case of the sequential system. In the simultaneous system, the composite video signal generated by the television transmitter corresponds very closely to the signal produced by the conventional monochrome television transmitters. In both systems, the horizontal synchronizing impulse appears superimposed on the horizontal blanking pedestal or impulse for use in controlling the horizontal retrace and blanking period in the reproduction of the picture by the receiver. In the simultaneous color system, a color subcarrier is superimposed upon the monochrome video signal, and a series of color synchronizing impulses occurring at the rate of 3.898125 megacycles is superimposed upon the horizontal blanking impulse in lagging time relation to the horizontal synchronizing impulse.

These color impulses or color burst portion of this composite video signal is used to maintain proper synchronism between the receiver picture and the scanning of the transmitted image whereupon it is necessary to insure that the entire color burst and only the color burst is available to the dependent television receiver circuits. In order to separate the color bursts for use by these dependent circuits, it is conventional practice to utilize the retrace or "kickback" impulse from the horizontal deflection circuits as a gate for permitting the color burst portion of the carrier signal to get through, this kickback pulse occurring for the most part, in exact synchronism with the color burst. However, it has been experienced, that the horizontal kickback impulse which is initiated by the carrier synchronizing pulse drifts slightly, thereby changing the phase relationship between the color burst and the kickback impulse. If this shift in phase is of sufficient magnitude, and is in a direction leading the color burst, a portion of the burst will be lost thereby destroying or preventing the necessary full burst from getting through to the dependent circuits. Conversely, if the retrace pulse lags or occurs at a later time than the color burst, a portion of the color subcarrier is gated through to the dependent circuit which disrupts the color synchronization.

It is therefore an object of this invention to provide a synchronizing circuit in a simultaneous color television receiver which will insure reliable separation of the color synchronizing impulses for use by the dependent receiver circuits.

It is another object of this invention to provide a synchronizing circuit for television receiving systems which will overcome the deleterious effects produced by phase shift in the signal produced by the horizontal deflection circuits, with respect to the carrier synchronizing impulses.

It is a still further object of this invention to provide a synchronizing circuit for a color television receiver which in effect delays the horizontal synchronizing impulse so that the latter coincides with the deflection retrace impulse whereby the retrace impulse can be used for reliable gating purposes of the selected synchronizing impulse.

It is still another object of this invention to provide a synchronizing system for a color television receiver which will improve the stability of color rendition of the picture even in the presence of noise.

In the accomplishment of this invention, an additional circuit component is inserted in the conventional receiver system. This additional circuit component comprises essentially a delaying circuit which is responsive to the occurrence of the horizontal synchronizing impulse of the video signal for generating a gating pulse which may be accurately timed to occur simultaneously with the occurrence of the color synchronizing impulses (auxiliary synchronizing impulses) or some other signal which is desired to be separated in the television receiver for synchronizing purposes. As will be explained more fully hereafter, the delay is accomplished by the use of a shock-excited resonant circuit which may be designed to produce a useable wave occurring at a time after the occurrence of the initiating pulse.

Other objects of this invention will become apparent as the description proceeds.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claims is not violated.

Figure 1:
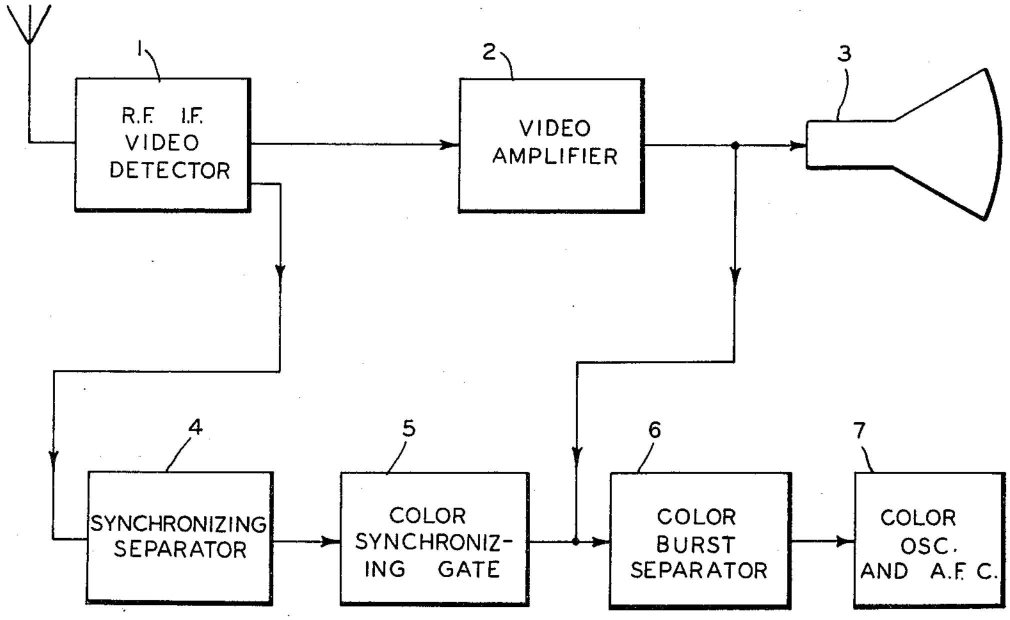
Fig. 1 is a block diagram of a portion of a simultaneous color television receiver incorporating one embodiment of this invention.
Figure 3:
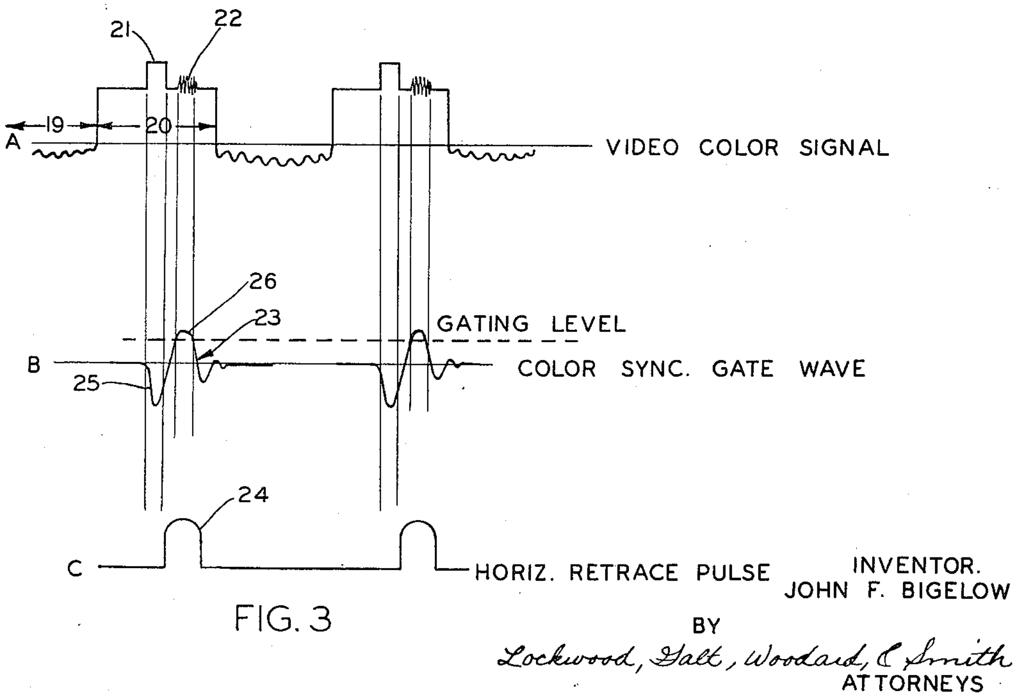
Fig. 3 is a graphic representation of certain waveforms occurring in the foregoing circuits.

With reference to the drawings and more particularly to Figs. 1 and 3, the block 1 indicates the usual radio frequency, intermediate frequency and video detector circuits contained in a television receiver. The demodulated video signal from this block 1 circuitry is coupled to the video amplifier 2 which in turn is coupled to the picture reproducting tube 3. The detected video signal is also coupled from the circuit 1 to a conventional synchronizing impulse separating circuit 4 of conventional design which serves the function of separating the horizontal and vertical synchronizing signals contained in the composite video signal for controlling the vertical and horizontal deflection receiver circuits, respectively (not shown). The separated horizontal synchronizing impulses are coupled from the synchronizing separator 4 into a color synchronizing, gating circuit 5 which produces a wave such as that represented by Graph B of Fig. 3. This wave combined with the signal from the video amplifier 2 is fed to a self-biased, or equivalent biasing arrangement, color burst separating circuit 6 which serves the purpose of separating the color synchronizing impulses appearing in the composite video carrier signal from the other portions of the signal for controlling the frequency of a conventional color oscillator 7.

Figure 4:
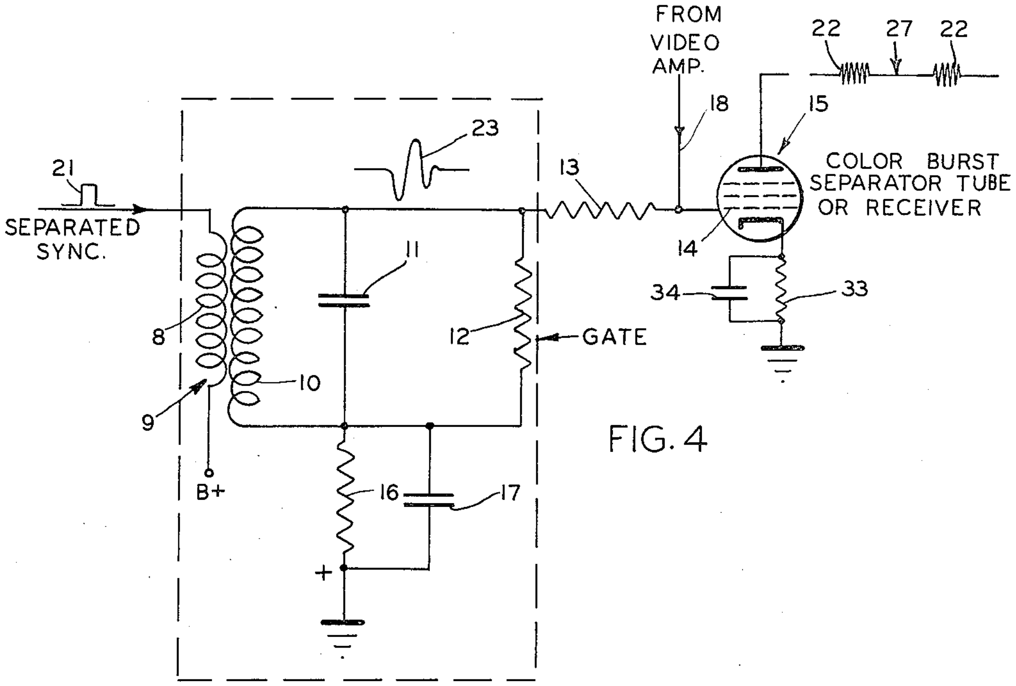
Fig. 4 is a circuit diagram of a portion of the embodiment shown in Fig. 1.

In the system of Fig. 1, the invention is principally directed to the use of the circuitry represented by the block 5, which is shown in detail in Fig. 4. The horizontal deflection synchronizing signal from the separator 4 is coupled to the primary winding 8 of a transformer 9 in which the secondary winding 10 has bridged thereacross a condenser 11 and a resistor 12. One end of the secondary winding 10 is connected by means of a resistor 13 to the control grid 14 of a color burst separator tube 15, while the other end of the winding 10 is connected to ground through a resistor 16 and a condenser 17 which is shunted across the resistor 16.

A wire 18 leading from the video amplifier 2 is also connected to the grid 14.

The transformer 9, condenser 11, and resistor 12 constitute a delaying circuit of this invention in the form of a heavily damped resonant circuit which may be shock excited to produce a damped sine wave of preselected frequency. The values of inductance, capacitance, and resistance of this circuit may be suitably chosen in a manner well known to the art to produce the desired amplitude and frequency of this damped wave which serves the purpose to be described hereafter.

Now with reference to Fig. 3, Graph A shows a portion of a typical carrier signal transmitted by a transmitter using the simultaneous color television system. This signal is comprised of the combination video information and color subcarrier 19, the usual blanking pulse 20, the horizontal synchronizing impulse 21 which is superimposed on the blanking pulse 20, and the color synchronizing impulses 22 which are currently standardized to occur at the rate of 3.898125 megacycles. The wave produced by the gate circuit 5 (shown in diagram Fig. 4) appears in Graph B of Fig. 3, and the usual horizontal retrace or kickback impulse 24 which is generated by the horizontal deflection circuits and which is initiated in the receiver by the synchronizing impulse 21 is shown in Graph C.

For the moment, disregard the wave of Graph B for an explanation of the prior art systems. In the prior art systems, the synchronizing pulse 21 was separated from the composite video signal by means of the conventional synchronizing pulse separator 4 and then used to initiate the retrace pulse generated by the receiver horizontal deflection circuits. Since this retrace pulse occurred slightly after the start of a synchronizing pulse 21, and extended for a period of time including the color burst 22, it was used as a gating signal for separating the color burst 22 from the other portions of the composite radio signal of Graph A. The results obtained by this method of separation was satisfactory only so long as the receiver horizontal deflection circuits maintained the retrace impulse 24 in phase synchronism with the color burst 22. But, as explained previously, when the horizontal deflection circuit shifted in a direction to make the pulse 24 occur earlier or later than that shown, either certain portions of the burst 22 were lost entirely, or a part of the color subcarrier was included which disrupted the proper synchronizing signals being fed to the color oscillator.

With the present invention, it is possible to produce a gating signal 23 which is independent of the retrace pulse produced by the horizontal deflection circuits thereby obviating the difficulty of shifting phase relation between the horizontal deflection circuits and the occurrence of the color impulses. Essentially, the wave 23 is produced by shock exciting the resonant circuit 10, 11, 12 by means of the synchronizing impulse 21, the first lobe of the wave 23, represented by the reference numeral 25, occurring substantially coincident with the synchronizing impulse 21, and the opposite lobe or impulse 26 being substantially coincident with the occurrence of the color burst 22. With this phasing arrangement, the wave 26 of the signal 23 may be used to gate the color burst separating circuit 6 for permitting the passage therethrough of only the color burst 22, and it has been found in practice, that the signal 23 may be easily controlled with excellent color burst separation resulting therefrom.

The wave 23 of Fig. 3 is generated by the gating circuit 5 as more clearly shown in Fig. 4. The synchronizing impulse 21 which is taken from the synchronizing separator 24 is used to shock excite the transformer 9 to produce over the secondary winding 10 the waveform 23, the parameters of the component making up this gating circuit 5 being selected to produce a damped wave having a frequency which will cause the lobe 26 to coincide in time with the occurrence of burst 22. Since the composite video signal (Graph A) is fed to the grid 14 of the tube 15 from the video amplifier, the wave 23 and the composite signal will be suitably mixed for controlling the grid 14. This grid 14 is normally biased to cut off and the magnitude of the lobe 26 of the wave 23 is so selected that as it nears its peak (as represented by the dashed line in Graph B of Fig. 3) it will drive the grid 14 sufficiently positive to cause the tube 15 to conduct. Since this period of conduction occurs coincident with the occurrence of the color burst 22, it is seen that the tube 15 will conduct only the color burst. A representative wave 27 in Fig. 4 constitutes the output signal of the color burst separating circuit 6.

Self biasing for the tube 15 is obtained by the use of the resistor 16 and condenser 17, the value of resistor 16 being so chosen that conduction by the grid 14 will produce a negative potential at the top of the resistor 16 which serves to drive the grid 14 to cut off. Bias may also be provided by resistor 33 which is bypassed by condenser 34.

The condenser 17 is chosen to have a relatively large value of capacity so as to provide a large time constant for the circuit combination 16, 17. Thus, the biasing parameters may be so chosen as to permit the control grid 14 to be triggered only by the positive loop 26 of the wave 23.

Now it has been discovered in the use of the embodiment of the foregoing description that noise signals which either pass through or are developed in the synchronizing separator circuit will shock excite the gating circuit 5 and produce a gating wave 23 which is out of step with the color burst 22. Of course, when this occurs, the color burst separating tube 15 is made conductive at the wrong time, thereby destroying the proper sequential occurrence of the color burst 22 in the wave 27 (Fig. 4). In order to avoid gating of the tube 15 by a wave 23 resulting from such noise, the embodiment of this invention illustrated by Figs. 2 and 5 is used.

Figure 2:
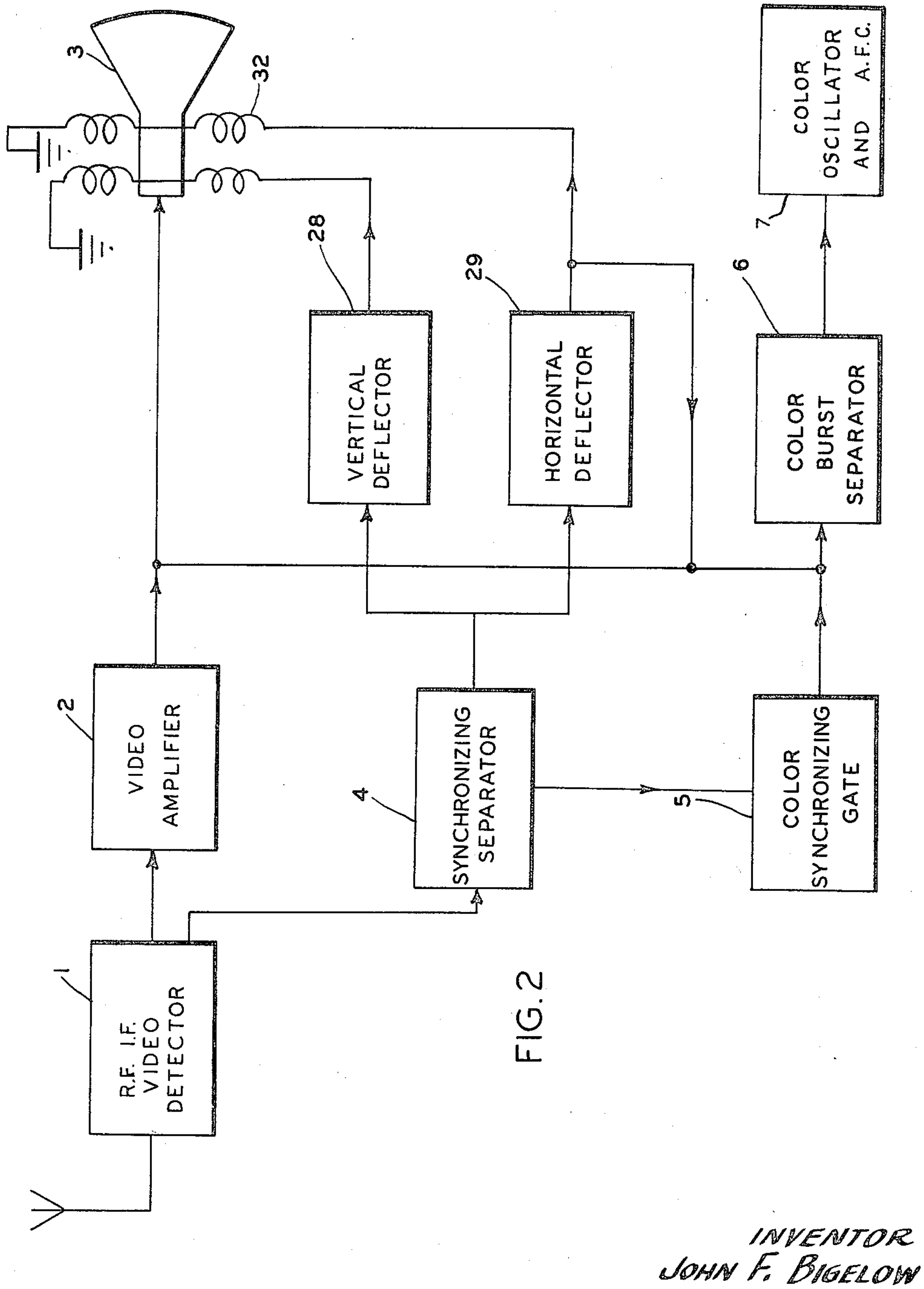
Fig. 2 is a block diagram similar to Fig. 1 of another embodiment of this invention.

With reference to Fig. 2 first, like numerals have been assigned like components, since the circuit of this Fig. 2 is substantially identical to that of Fig. 1. In addition to the circuit components of Fig. 1, the vertical and horizontal deflection circuits represented by the reference numerals 28 and 29 respectively are coupled to the output circuit of the synchronizing signal separation circuit 4, the vertical and horizontal synchronizing impulses respectively, being coupled into the vertical and horizontal deflection circuits 28 and 29 in the customary manner. The principal difference between the systems represented by Figs. 1 and 2 resides in the coupling of the horizontal retrace signal from the horizontal deflection circuit 29 back into the input circuit of the color burst separator 6. Thus, three signals consisting of the signals obtained from the gating circuit 5, the video amplifier 2, and the horizontal deflection circuit 29, are fed to the grid 14 of the color burst separator tube 15.

Figure 5:
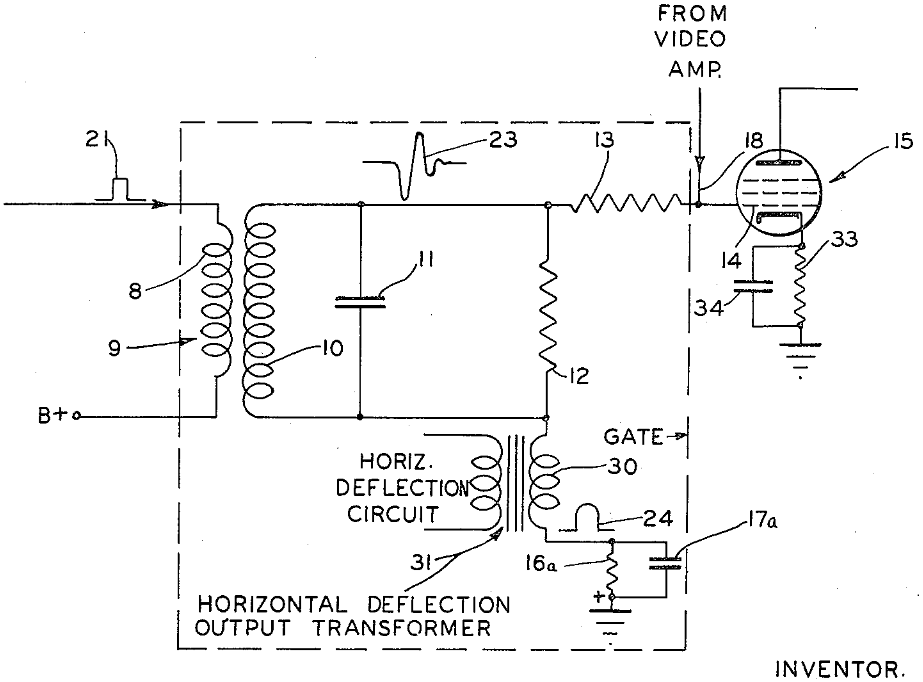
Fig. 5 is a circuit diagram of a portion of the embodiment shown in Fig. 2.

By comparison of the circuit diagram of Figs. 4 and 5, it will be seen that they are very similar with the exception that a winding 30 on the horizontal deflection circuit output transformer 31 is interposed between the time constant circuit 16*a* and 17*a* and the lower end of the transformer winding 10. Another winding (not shown) corresponding to the winding 30 on the transformer 31 is connected in the customary manner to the deflecting yoke 32 (Fig. 2) which controls the horizontal deflection of the picture tube beam of the tube 3. With this arrangement, the retrace pulse 24, which is induced in the secondary windings of the transformer 31, and which is initiated by the carrier synchronizing impulse 21, will occur in synchronism with the generation of the gating wave 23. As in the case of circuit 24, the positive portion 26 of the wave 23 is caused to occur in synchronism with the color burst 22.

The bias voltage developed across 16*a* and 17*a* is equal to nearly the peak-to-peak amplitude of the applied combination signals 23 and 24, so that either, occurring alone and out of synchronous relationship is not of sufficient magnitude to cause conduction of tube 15. Thus, any waves 23 which are produced by noise which occurs between the successive retrace impulses 24 will not cause the tube 15 to conduct thereby providing immunity against noise which may be fed to the gating circuit.

The wave 24 may be made more broad by the use of integrating networks, so that even though its phase relationship with respect to wave 23 should change within normal limits, the two waves 23 and 24 are yet additive. Wave 24 may be made so broad, prior to addition with wave 23, that it extends into the time normally assigned to active picture (after the termination of horizontal blanking pulse 20). Under such conditions, it is impossible that signal subcarrier components shall be passed through tube 15 since time of conduction is determined by wave 23.

The color burst separator tube 15 of Fig. 5 operates similarly to that of Fig. 4 in which the control grid is normally biased beyond cut-off by means of a potential developed across the resistor 16*a*. The condenser 17*a* having a suitably large capacity charges to this cut-off potential and maintains the grid 14 at cut-off in between the occurrence of successive pulses 21. Bias voltage may also be developed across resistor 34*a* and condenser 33*a* which together represent a long time constant relative to the horizontal scanning time.

It will now be apparent from an examination of Fig. 3 that since both pulses 26 and 24 of curves B and C respectively, occur substantially at the same time, both pulses may be utilized in additive form as the gating potential for separating the color burst 22 from the remainder of the video wave. With the explanation of the foregoing, it will readily occur to persons skilled in the art that a circuit similar to the one which produces the wave 23 may be used for gating other signals in a television receiver with particular use being made of the second half 26 of the generated wave as the gate controlling pulse.

What is claimed is:

1. In a television receiver adapted to receive a composite television signal comprising a video signal, a blanking signal, a horizontal synchronizing signal, and an auxiliary synchronizing signal which occurs during said blanking signal and after said horizontal synchronizing signal; a picture signal reproducing tube, a video amplifier circuit conductively connected to said tube, means for impressing said television signal upon said amplifier, a synchronizing signal separator for separating said horizontal synchronizing signal from the television signal, a synchronizing wave generator coupled to said signal separator circuit and responsive to the separated horizontal synchronizing signal to produce a damped sine wave, the second half cycle of which coincides in time with the occurrence of said auxiliary synchronizing signal, and a normally nonconductive circuit coupled to said wave generator responsive to said half cycle to be conductive during the period of a predetermined portion of said half cycle, said nonconductive circuit also coupled to said amplifier circuit whereby said auxiliary synchronizing signal only of the composite signal will be conducted by said normally nonconductive circuit during the period of conduction caused by said portion of said half cycle.

2. In a television receiver adapted to receive a composite television signal comprising a video signal, a blanking signal, a horizontal synchronizing signal, and an auxiliary synchronizing signal which occurs during said blanking signal and after said horizontal synchronizing signal; a picture signal reproducing tube, a video amplifier circuit conductively connected to said tube, means for impressing said television signal upon said amplifier, a synchronizing signal separator circuit for separating said horizontal synchronizing signal from the television signal, a synchronizing wave generator coupled to said signal separator circuit and responsive to the separated horizontal synchronizing signal to produce a wave having a predetermined parameter, said wave generator including a resonant circuit which when shock excited by said horizontal synchronizing signal produces a parameter timed to occur coincidentally with the occurrence of said auxiliary synchronizing signal, and a normally nonconductive circuit coupled to said wave generator responsive to said parameter to be conductive during the period of said parameter, said nonconductive circuit also being coupled to said amplifier circuit whereby said auxiliary synchronizing signal only will be conducted by said normally nonconductive circuit during the period of conduction caused by said parameter.

3. In a television receiver adapted to receive a composite television signal comprising a video signal, a blanking signal, a horizontal synchronizing signal, and an auxiliary synchronizing signal which occurs during said blanking signal and after said horizontal synchronizing signal; a picture signal reproducing tube, a video amplifier circuit conductively connected to said tube, means for impressing said television signal upon said amplifier, a synchronizing signal separator circuit for separating said horizontal synchronizing signal from the television signal, a synchronizing wave generator coupled to said signal separator circuit and responsive to the separated horizontal synchronizing signal to produce a wave having a predetermined parameter, said generator including an inductance and a capacitor connected in parallel which when shock excited by said horizontal synchronizing signal produces a parameter timed to occur coincidentally with the occurrence of said auxiliary synchronizing signal, and a normally nonconductive circuit coupled to said wave generator responsive to said parameter to be conductive during the period of said parameter, said nonconductive circuit also being coupled to said amplifier circuit whereby said auxiliary synchronizing signal only will be conducted by said normally nonconductive circuit during the period of conduction caused by said parameter.

4. In a television receiver adapted to receive a composite television signal comprising a video signal, a blanking signal, a horizontal synchronizing signal, and an auxiliary synchronizing signal which occurs during said blanking signal and after said horizontal synchronizing signal; a picture signal reproducing tube, a video amplifier circuit conductively connected to said tube, means for impressing said television signal upon said amplifier, a synchronizing signal separator circuit for separating said horizontal synchronizing signal from the television signal, a synchronizing wave generator coupled to said signal separator circuit and responsive to the separated horizontal synchronizing signal to produce a wave having a predetermined parameter, said generator including an inductance and a capacitor connected in parallel which when shock excited by said horizontal synchronizing signal produces a parameter timed to occur coincidentally with the occurrence of said auxiliary synchronizing signal, and a normally nonconductive circuit coupled to said wave generator and including an electron discharge device having a control electrode which is normally biased to cut off, said parameter causing said electron discharge device to conduct during the period thereof, said normally nonconductive circuit being also coupled to said amplifier circuit whereby said auxiliary signal only will be conducted by said electron discharge device during the period of conduction caused by said parameter.

5. In a television receiver adapted to receive a composite television signal comprising a video signal, a blanking signal, a horizontal synchronizing signal, and an auxiliary synchronizing signal which occurs during said blanking signal and after said horizontal synchronizing signal, a picture signal reproducing tube, a video amplifier circuit conductively connected to said tube, means for impressing said television signal upon said amplifier, a synchronizing signal separator circuit for separating said horizontal synchronizing signal from the television signal, a synchronizing wave generator coupled to said signal separator circuit and responsive to the separated horizontal synchronizing signal to produce a wave having a predetermined parameter, said generator including an inductance and a capacitor connected in parallel which when shock excited by said horizontal synchronizing signal produces a parameter timed to occur coincidentally with the occurrence of said auxiliary synchronizing signal, and a normally nonconductive circuit coupled to said wave generator and including an electron discharge device having a control electrode which is normally biased to cut off, time constant means operatively coupled to said electron discharge device operative to provide the aforesaid bias, said parameter causing said electron discharge device to conduct during the period thereof, said normally nonconductive circuit also coupled to said amplifier circuit whereby said auxiliary signal only will be conducted by said electron discharge device during the period of conduction caused by said parameter.

6. In a television receiver adapted to receiver a composite television signal comprising a video signal, a blanking signal, a horizontal synchronizing signal, and an auxiliary synchronizing signal which occurs during said blanking signal and after said horizontal synchronizing signal; a picture signal reproducing tube, a video amplifier circuit conductively connected to said tube, means for impressing said television signal upon said amplifier, a synchronizing signal separator circuit for separating said horizontal synchronizing signal from the television signal, a synchronizing wave generator coupled to said signal separator circuit and responsive to the separated circuit and responsive to the separated horizontal synchronizing signal to produce a wave having a predetermined parameter, said generator including an inductance and a capacitor connected in parallel which when shock excited by said horizontal synchronizing signal produces a parameter timed to occur coincidentally with the occurrence of said auxiliary synchronizing signal, and a normally nonconductive circuit coupled to said wave generator and including an electron discharge device having a control electrode which is normally biased to cut off, one side of said inductance conductively connected to said control electrode, bias developing means conductively connected to the other side of said inductance and operative to provide the aforesaid bias, said parameter causing said electron discharge device to conduct during the period thereof, said normally nonconductive circuit also coupled to said amplifier circuit whereby said auxiliary signal only will be conducted by said electron discharge device during the period of conduction caused by said parameter.

7. In a television receiver adapted to receive a composite television signal comprising a video signal, a blanking signal, a horizontal synchronizing signal, and an auxiliary synchronizing signal which occurs during said blanking signal and after said horizontal synchronizing signal; a picture signal reproducing tube, a video amplifier circuit conductively connected to said tube, means for impressing said television signal upon said amplifier, a synchronizing signal separator circuit for separating said horizontal synchronizing signal from the television signal, a synchronizing wave generator coupled to said signal separator circuit and responsive to the separated horizontal synchronizing signal to produce a wave having a predetermined parameter, said generator including an inductance and a capacitor connected in parallel which when shock excited by said horizontal synchronizing signal produces a parameter timed to occur coincidentally with the occurrence of said auxiliary synchronizing signal, said generator further including a damping resistor connected between the ends of said inductance, and a time constant circuit connected between one end of said inductance and ground, said time constant circuit comprising a parallel connected condenser and resistor, a normally nonconductive circuit coupled to the other end of said inductance and including a tube having control grid and cathode electrodes, said other end of said inductance being conductively connected to said grid electrode and said cathode electrode being connected to ground whereby current drawn by said grid will produce a cut-off bias for said tube across said time constant circuit, said parameter overcoming the bias on said grid to cause said tube to conduct, and means coupling said amplifier circuit to said grid whereby said auxiliary signal will be conducted by said tube only during the period of conduction caused by said parameter.

8. In a television receiver adapted to receive a composite television signal comprising a video signal, a blanking signal, a horizontal synchronizing signal and an auxiliary synchronizing signal which occurs subsequent to said horizontal synchronizing signal; a picture signal reproducing tube, a video amplifier circuit conductively connected to said tube, means for impressing said television signal upon said amplifier, a synchronizing signal separator circuit for separating said horizontal synchronizing signal from the television signal, a synchronizing wave generator coupled to said separator circuit and responsive to the separated horizontal signal to produce a wave having a predetermined parameter, said parameter being timed to occur coincident with the occurrence of said auxiliary synchronizing signal, a horizontal scanning generator coupled to said separator circuit and controlled by said separated horizontal signal and operative to produce a retrace impulse which is initiated by said separated horizontal signal, said retrace impulse having a time duration which normally includes said auxiliary synchronizing signal, said horizontal scanning generator being operatively coupled to said wave generator, and a normally nonconductive circuit coupled to said wave generator responsive to the simultaneously occurring portions of said parameter and said retrace impulse to be conductive during the period of said parameter, said nonconductive circuit being also coupled to said amplifier circuit whereby said auxiliary synchronizing signal only will be conducted by said normally nonconductive circuit during the period of conduction caused by the joint occurrence of said parameter and said retrace impulse.

9. In a television receiver adapted to receive a composite television signal comprising a video signal, a blanking signal, a horizontal synchronizing signal and an auxiliary synchronizing signal which occurs subsequent to said horizontal synchronizing signal; a picture signal reproducing tube, a video amplifier circuit conductively connected to said tube, means for impressing said television signal upon said amplifier, second means for separating said horizontal synchronizing signal from the television signal, a synchronizing wave generator coupled to said means and responsive to the separated horizontal signal to produce a damped sine wave, the second half wave of which coincides in time with the occurrence of said auxiliary synchronizing signal, said second half wave being timed to occur coincident with the occurrence of said auxiliary synchronizing signal, a horizontal scanning generator coupled to said second means and controlled by said separated horizontal signal and operative to produce a retrace impulse which is initiated by said separated horizontal signal, said retrace impulse having a time duration which normally includes said auxiliary synchronizing signal, said horizontal scanning generator being operatively coupled to said wave generator, and a normally nonconductive circuit coupled to said wave generator responsive to the simultaneously occurring portions of said half cycle and said retrace impulse to be conductive during the period of said half cycle, said nonconductive circuit being also coupled to said amplifier circuit whereby only said auxiliary synchronizing signal will be conducted by said normally nonconductive circuit during the period of conduction caused by the joint occurrence of said half cycle and said retrace impulse.

10. In a television receiver adapted to receive a composite television signal comprising a video signal, a blanking signal, a horizontal synchronizing signal and an auxiliary synchronizing signal which occurs subsequent to said horizontal synchronizing signal; a picture signal reproducing tube, a video amplifier circuit conductively connected to said tube, means for impressing said television signal upon said amplifier, second means for separating said horizontal synchronizing signal from the television signal, a synchronizing wave generator coupled to said means and responsive to the separated horizontal signal to produce a wave having a predetermined parameter, said wave generator including a resonant circuit which when shock excited by said horizontal synchronizing signal produces a parameter timed to occur coincidentally with the occurrence of said auxiliary synchronizing signal, a horizontal scanning generator coupled to said second means and controlled by said separated horizontal signal and operative to produce a retrace impulse which is initiated by said separated horizontal signal, said retrace impulse having a time duration which normally includes said auxiliary synchronizing signal, said horizontal scanning generator being operatively coupled to said wave generator, and a normally nonconductive circuit coupled to said wave generator responsive to the simultaneously occurring portions of said parameter and said retrace impulse to be conductive during the period of said parameter, said non-conductive circuit being also coupled to said amplifier circuit whereby only said auxiliary synchronizing signal will be conducted by said normally nonconductive circuit during the period of conduction caused by the joint occurrence of said parameter and said retrace impulse.

11. In a television receiver adapted to receive a composite television signal comprising a video signal, a blanking signal, a horizontal synchronizing signal and an auxiliary synchronizing signal which occurs subsequent to said horizontal synchronizing signal; a picture signal reproducing tube, a video amplifier circuit conductively connected to said tube, means for impressing said television signal upon said amplifier, second means for separating said horizontal synchronizing signal from the television signal, a synchronizing wave generator coupled to said means and responsive to the separated horizontal signal to produce a wave having a predetermined parameter, said generator including an inductance and a capacitor connected in parallel which when shock excited by said horizontal synchronizing signal produces a parameter timed to occur coincidentally with the occurence of said auxiliary synchronizing signal, a horizontal scanning generator coupled to said second means and controlled by said separated horizontal signal and operative to produce a retrace impulse which is initiated by said separated horizontal signal, said retrace impulse having a time duration which normally includes said auxiliary synchronizing signal, said horizontal scanning generator being operatively coupled to said wave generator, and a normally nonconductive circuit coupled to said wave generator responsive to the simultaneously occurring portions of said parameter and said retrace impulse to be conductive during the period of said parameter, said nonconductive circuit being also coupled to said amplifier circuit whereby only said auxiliary synchronizing signal will be conducted by said normally nonconductive circuit during the period of conduction caused by the joint occurrence of said parameter and said retrace impulse.

12. In a television receiver adapted to receive a composite television signal comprising a video signal, a blanking signal, a horizontal synchronizing signal and an auxiliary synchronizing signal which occurs subsequent to said horizontal synchronizing signal; a picture signal reproducing tube, a video amplifier circuit conductively connected to said tube, means for impressing said television signal upon said amplifier, second means for separating said horizontal synchronizing signal from the television signal, a synchronizing wave generator coupled to said second means and responsive to the separated horizontal signal to produce a wave having a predetermined parameter, said generator including an inductance and a capacitor connected in parallel which when shock excited by said horizontal synchronizing signal produces said parameter timed to occur coincidentally with the occurrence of said auxiliary synchronizing signal, said generator further including a damping resistor connected between the ends of said inductance and a time constant circuit operatively connected between one end of said inductance and ground, said time constant circuit comprising a parallel connected condenser and resistor, third means connected in series between said time constant circuit and said one end of said inductance, a horizontal scanning generator coupled to said third means and controlled by said separated horizontal signal and operative to produce a retrace impulse which is initiated by said separated horizontal signal, said retrace pulse impulse having a time duration which normally includes said auxiliary synchronizing signal, said third means operative to insert a gating signal corresponding to said retrace pulse into said wave generator whereby said parameter and said gating signal will occur simultaneously and be mixed in additive relation, a normally nonconductive circuit coupled to the other end of said wave generator inductance and including a tube having control grid and cathode electrodes, said other end of said inductance being conductively connected to said grid electrode and said cathode electrode being connected to ground whereby current drawn by said grid will produce a cut-off bias for said tube across said time constant circuit, the combination of said parameter and said gating signal overcoming the bias on said grid to cause said tube to conduct, and means coupling said amplifier circuit to said grid whereby said auxiliary signal will be conducted by said tube only during the period of conduction caused by said parameter and said gating pulse.

13. In a television receiver adapted to receive a composite television signal comprising a video signal, a blanking signal, a horizontal synchronizing signal, and an auxiliary synchronizing signal which occurs during said blanking signal and after said horizontal synchronizing signal; first means for utilizing said television signal, second means for separating said horizontal synchronizing signal from the television signal, a synchronizing wave generator coupled to said second means and responsive to the separated horizontal synchronizing signal to produce a wave having a predetermined parameter, said wave generator including a resonant circuit which when shock excited by said horizontal synchronizing signal produces a parameter timed to occur coincidentally with the occurrence of said auxiliary synchronizing signal, and a normally nonconductive circuit coupled to said wave generator responsive to said parameter to be conductive during the period of said parameter, said nonconductive circuit also being coupled to said first means whereby said auxiliary synchronizing signal only will be conducted by said normally nonconductive circuit during the period of conduction caused by said parameter.

14. In a television receiver adapted to receive a composite television signal comprising a video signal, a blanking signal, a horizontal synchronizing signal and an auxiliary synchronizing signal which occurs subsequent to said horizontal synchronizing signal; a picture signal reproducing tube, a video amplifier circuit conductively connected to said tube, first means for utilizing said television signal, second means for separating said horizontal synchronizing signal from the television signal, a synchronizing wave generator coupled to said second means and responsive to the separated horizontal signal to produce a wave having a predetermined parameter, said parameter being timed to occur coincidentally with the occurrence of said auxiliary synchronizing signal, a horizontal scanning generator coupled to said second means and controlled by said separated horizontal signal and operative to produce a retrace impulse which is initiated by said separated horizontal signal, said retrace impulse having a time duration which normally includes said auxiliary synchronizing signal, said horizontal scanning generator being operatively coupled to said wave generator, and a normally nonconductive circuit coupled to said wave generator responsive to the simultaneously occurring portions of said parameter and said retrace impulse to be conductive during the period of said parameter, said nonconductive circuit being also coupled to first means whereby said auxiliary synchronizing signal only will be conducted by said normally nonconductive circuit during the period of conduction caused by the joint occurrence of said parameter and said retrace impulse.

References Cited in the file of this patent

UNITED STATES PATENTS

| | | |
|---|---|---|
| 2,539,440 | Labin | Jan. 30, 1951 |
| 2,546,972 | Chatterjea | Apr. 3, 1951 |
| 2,594,380 | Barton | Apr. 29, 1952 |
| 2,653,187 | Luck | Sept. 22, 1953 |